United States Patent
Shi et al.

(10) Patent No.: US 11,159,981 B2
(45) Date of Patent: Oct. 26, 2021

(54) CONGESTION PROCESSING METHOD AND APPARATUS

(71) Applicant: XI'AN ZHONGXING NEW SOFTWARE CO., LTD., Xi'an (CN)

(72) Inventors: Xiaojuan Shi, Shenzhen (CN); He Huang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 173 days.

(21) Appl. No.: 16/328,606

(22) PCT Filed: Aug. 22, 2017

(86) PCT No.: PCT/CN2017/098539
§ 371 (c)(1),
(2) Date: Feb. 26, 2019

(87) PCT Pub. No.: WO2018/036492
PCT Pub. Date: Mar. 1, 2018

(65) Prior Publication Data
US 2020/0413288 A1 Dec. 31, 2020

(30) Foreign Application Priority Data
Aug. 26, 2016 (CN) .......................... 201610740528.1

(51) Int. Cl.
*H04W 28/02* (2009.01)
*H04L 12/823* (2013.01)
*H04W 28/06* (2009.01)

(52) U.S. Cl.
CPC ......... *H04W 28/0289* (2013.01); *H04L 47/32* (2013.01); *H04W 28/065* (2013.01)

(58) Field of Classification Search
None
See application file for complete search history.

(56) References Cited

U.S. PATENT DOCUMENTS

2003/0095519 A1* 5/2003 Kuo ........................ H04L 47/14
370/338
2004/0184437 A1* 9/2004 Lee ....................... H04L 47/225
370/349

(Continued)

FOREIGN PATENT DOCUMENTS

CN          1832389 A    9/2006
CN        101483505 A    7/2009

(Continued)

OTHER PUBLICATIONS

International Search Report and Written Opinion for International Appl. No. PCT/CN2017/098539, dated Nov. 22, 2017.

*Primary Examiner* — Eunsook Choi
(74) *Attorney, Agent, or Firm* — Foley & Lardner LLP

(57) ABSTRACT

Provided is a congestion processing method and apparatus. The method includes: starting a discard timer at a data link protocol sublayer of a transmitting end for a service data unit (SDU); and in response to determining that the discard timer expires, discarding the SDU at the data link protocol sublayer, and performing one of following operations on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

20 Claims, 8 Drawing Sheets

Start a discard timer at a data link protocol sublayer of a transmitting end for a SDU — S202

When the discard timer expires, discard the SDU at the data link protocol sublayer, and perform one of following operations on the SDU having constituted a data PDU at the data link protocol sublayer: replacing the SDU in the data PDU with a padding bit, discarding the data PDU and transmitting a discard notification PDU, and continuing to transmit the data PDU — S204

(56) References Cited

U.S. PATENT DOCUMENTS

| | | | | |
|---|---|---|---|---|
| 2016/0164793 A1* | 6/2016 | Basu Mallick | ....... | H04W 28/08 370/235 |
| 2016/0183221 A1* | 6/2016 | Yi | ........................ | H04L 1/1851 370/329 |

FOREIGN PATENT DOCUMENTS

| | | |
|---|---|---|
| CN | 104837163 A | 8/2015 |
| WO | WO-2015/119410 A1 | 8/2015 |

\* cited by examiner

CONGESTION PROCESSING METHOD AND APPARATUS

CROSS-REFERENCE TO RELATED APPLICATIONS

This is a National Stage Application, filed under 35 U.S.C. 371, of International Patent Application No. PCT/CN2017/098539, filed on Aug. 22, 2017, which claims priority to Chinese Patent Application No. 201610740528.1, filed on Aug. 26, 2016, the contents of both of which are incorporated herein by reference in their entireties.

TECHNICAL FIELD

The present disclosure relates to communications and, in particular, to a congestion processing method and apparatus.

BACKGROUND

After a few decades of development, wireless communication technologies have evolved from 1th generation (1G) to 4th generation (4G). Although the four generations of wireless communication technologies have different designs from the system framework to the physical layer technology, three-layer protocol models are used in the design of radio interfaces, that is, a physical layer (L1), a data link layer (L2) and a network layer (L3). A long term evolution (LTE) system is used as an example. FIG. 1 is architecture of a user plane protocol stack of a radio interface (Uu interface) of a LTE system in the related art according to the present disclosure. The protocol stack architecture only shows the L1 and L2 defined by the LTE from the perspective of LTE technologies and the L3 is not illustrated. In the LTE system, the L2, from bottom to top, further includes protocol sublayers such as medium access control (MAC), radio link control (RLC) and a packet data convergence protocol (PDCP). The MAC communicates with the physical layer (PHY) L1 through a transmission channel. And the PDCP communicates with the network layer through a packet data convergence protocol service access point (PDCP-SAP).

The functions of the LTE MAC layer include: mapping between a logical channel and the transmission channel; multiplexing a medium access control service data unit (MAC SDU) on one or more different logical channels onto one transmission block and then transmitting the transmission block to the transmission channel; demultiplexing the MAC SDU on the one or more different logical channels in the transmission block received from the transmission channel; scheduling information reporting; transmission format selection; priority processing among different UEs through the dynamic scheduling; priority processing of different logic channels within the UE; and a hybrid automatic repeat request (HARQ).

Three modes exist in the LTE RLC layer: an acknowledged mode (AM), a unacknowledged mode (UM) and a transparent mode (TM), including functions of retransmission (implemented by an ARQ); reordering, RLC SDU concatenation; RLC SDU segmentation and reassembly; RLC protocol data unit (PDU) resegmentation; RLC PDU reordering, duplicate packet detection, RLC SDU discarding and RLC reestablishment.

In the above functions of the RLC layer, the function of the segmentation and reassembly is only supported in the AM mode, the functions of reordering, concatenation, segmentation and reassembly, duplicate packet detection, RLC SDU discarding are only supported in the AM and UM modes.

The above functions of the RLC layer may be classified into two types according to different requirements for the processing time. One type is the function of "high processing time requirement", including the functions of the RLC SDU concatenation, RLC SDU segmentation and reassembly; RLC PDU resegmentation and RLC PDU reordering. These functions are closely related to the scheduling and transmission timing sequence of the data and need to be completely processed within the time specified by the scheduling and transmission timing sequence. Other type is the function of "non-high processing time requirement", including the remaining functions other than the function of "high processing time requirement". These functions are not closely related to scheduling and transmission timing sequence.

The function of the LTE PDCP layer includes the functions of header compression and decompression; security functions, including encryption and decryption of data and signaling, completeness protection for signaling; reordering at the time of PDCP reconstruction, duplicate packet detection and retransmission (only supported when RLC adopts the AM mode); packet routing when a dual-link split bearer is supported; and reordering and retransmission (the retransmission is only supported when RLC adopts the AM mode).

In the LTE system, all functions of the MAC layer are the function of "high processing time requirement", and all functions of the PDCP layer are the function of "non-high processing time requirement".

Wireless communication technologies have been commercialized for decades, various intelligent terminals and applications have emerged, and the wireless communication technologies also have gradually penetrated into various vertical industries. The industry predicts that by 2020, the development indicators of the wireless communication technologies to achieve a 1000 times growth of mobile data traffic per region by 2020, a 10 to 100 times growth of throughput per user, a 10 to 100 times growth of the number of connection devices, and a 10 times extension of the battery life for low-power devices and a 5 times reduction of the end-to-end delay, which also are 5G technology research goals. In addition, 5G new radio need to be able to support various possible traffic, such as enhanced mobile broadband (eMBB), ultra reliable and low latency communications (URLLC), massive machine-type-communications (mMTC) and other types of communications.

The applicant has found that to achieve the 5G new radio technology goals, the 5G technology goals cannot be achieved simply by enhancing or upgrading the existing network. Therefore, it is necessary to further accelerate the exploration of new network deployment strategies and new technologies on the basis of the further evolution of the existing network and existing technologies. In terms of the network deployment strategies, on one hand, a more intensive deployment network can be considered and a high-frequency band with a larger bandwidth (such as 500 MHz-1 GHz), such as the frequency band above 6 GHz can be used. On the other hand, the LTE technology, 5G new radio, and other wireless communication technologies can be considered for joint use, such as the WLAN technology. In terms of the new technology research, 5G new waveform, new frame (or subframe) structure, new system architecture and enhanced communication process based on the new system architecture are designed.

However, the applicant has found that the L2 protocol function design in the related art cannot meet the 5G design goals due to its inherent architecture and function division. For example, there are some repeatedly implemented functions in the design of three protocol layers of the LTE L2, especially between the RLC and PDCP layers. For example, the functions of the reordering, duplicate packet detection and retransmission are implemented twice in each one of the two protocol layers. Such design of these repeat functions, on one hand, increase the processing overhead of hardware and software, on the one hand, and go against the implementation of 5G high speed, low power consumption and low latency technical indicators.

Therefore, in order to achieve the 5G technology goal, adapt to the new network deployment mode, new physical layer technology and new system architecture emerged in the 5G era, the industry has proposed to redesign the L2 protocol architecture and redistribute the L2 protocol function. One of the possible design ideas is to combine the function of "non-high processing time requirement" in the radio link control (RLC) layer and the function of the packet data convergence protocol (PDCP) layer into one protocol sub-layer for implementation, and the function of "high processing time requirement" in the RLC layer may be considered to be combined with the function of the media access control (MAC) layer into one protocol sub-layer for implementation, or an independent protocol sub-layer continues to be maintained to implement these functions.

Combining the function of the "non-high processing time requirement" in the RLC layer with the function of the PDCP layer into one protocol sublayer and removing the design of some repeat functions in the original LTE L2 protocol will make some key functions of the original LTE L2 not work, among which an important function is a PDCP discard function of the original LTE PDCP layer. The original intention of designing the PDCP discard function is to address congestion on the wireless link (for example, the transmission rate of the upper layer, such as a transmission control protocol (TCP) layer exceeds the transmission rate of the wireless link). Through discarding the data packet by the PDCP layer of the transmitting end, the fact of packet discarding is transmitted to the upper layer of the upper layer of the transmitting end, causing the upper layer to reduce the transmission rate and addressing the congestion (i.e., the transmission rate of the upper layer exceeds the transmission rate of the wireless link). The failure of the PDCP discard function will affect the traffic transmission and the user experience.

SUMMARY

Embodiments of the present disclosure provide a congestion processing method and apparatus to at least solve the problem of mismatching between the transmission rate of upper layer data and the transmission rate of radio link in the related art.

According to an embodiment of the present disclosure, a congestion processing method is provided. The method includes: starting a discard timer at a data link protocol sublayer of a transmitting end for a service data unit (SDU); and when the discard timer expires, discarding the SDU at the data link protocol sublayer, and performing one of following operations on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

According to an embodiment of the present disclosure, another congestion processing method is provided. The method includes: receiving a protocol data unit (PDU) at a data link protocol sublayer of a receiving end; when the PDU is a data PDU including a service data unit (SDU), restoring the SDU from the data PDU, and if all bits in the restored SDU are padding bits, ignoring the SDU in transmission of the SDU to an upper layer of the data link protocol sublayer; or when the PDU is a discard notification PDU, obtaining a sequence number DISCARD_SN of a discarded data PDU from the discard notification PDU, and if the DISCARD_SN is a sequence number of a data PDU to be received in sequence at the data link protocol sublayer, updating the data PDU to be received in sequence.

According to another embodiment of the present disclosure, a congestion processing apparatus, applied to a transmitting end is provided. The apparatus includes: a starting module, which is configured to start a discard timer at a data link protocol sublayer for a service data unit (SDU); and a processing module, which is configured to when the discard timer expires, discard the SDU at the data link protocol sublayer, and perform one of following operations on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

According to another embodiment of the present disclosure, another congestion processing apparatus, applied to a receiving end is provided. The apparatus includes: a receiving module, which is configured to receive a protocol data unit (PDU) at a data link protocol sublayer; and a processing module, which is configured to when the PDU is a data PDU including a service data unit (SDU), restore the SDU from the data PDU, and if all bits in the restored SDU are padding bits, ignore the SDU in transmission of the SDU to an upper layer of the data link protocol sublayer; or when the PDU is a discard notification PDU, obtain a sequence number DISCARD_SN of a discarded data PDU from the discard notification PDU, and if the DISCARD_SN is a sequence number of a data PDU to be received in sequence at the data link protocol sublayer, update the data PDU to be received in sequence.

According to another embodiment of the present disclosure, a congestion processing system is provided. The system includes a transmitting end and a receiving end. The transmitting end includes: a starting module, which is configured to start a discard timer at a data link protocol sublayer for a service data unit (SDU); and a first processing module, which is configured to when the discard timer expires, discard the SDU at the data link protocol sublayer, and perform one of following operations on the SDU having constituted a data protocol data unit (PDU) at the data link protocol sublayer: replacing the SDU in the data PDU with a padding bit, discarding the data PDU and transmitting a discard notification PDU, and continuing to transmit the data PDU. The receiving end includes: a receiving module, which is configured to receive a protocol data unit (PDU) at a data link protocol sublayer; and a second processing module, which is configured to when the PDU is a data PDU including a service data unit (SDU), restore the SDU from the data PDU, and if all bits in the restored SDU are padding bits, ignore the SDU in transmission of the SDU to an upper layer of the data link protocol sublayer; or when the PDU is a discard notification PDU, obtain a sequence number DISCARD_SN of a discarded data PDU from the discard notification PDU, and if the DISCARD_SN is a sequence number of a data PDU to be received in sequence at the data link protocol sublayer, update the data PDU to be received in sequence.

According to another embodiment of the present disclosure, a storage medium is further provided. The storage medium is configured to store program codes for executing the following steps:

starting a discard timer at a data link protocol sublayer of a transmitting end for a service data unit;

when the discard timer expires, the SDU at the data link protocol sublayer, and perform one of following operations on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

Through the present disclosure, in response to transmitting data by a transmitting end, a discard timer at a data link protocol sublayer of a transmitting end is started for a service data unit (SDU); when the discard timer expires, the SDU at the data link protocol sublayer is discarded, and one of following operations is performed on the SDU having constituted a data protocol data unit (PDU) at the data link protocol sublayer: replacing the SDU in the data PDU with a padding bit, discarding the data PDU and transmitting a discard notification PDU, and continuing to transmit the data PDU. The function of actively discarding a data packet of the transmitting end is implemented, achieving matching between the transmission rate of upper layer data and the transmission rate of radio link.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

Hereinafter the present disclosure will be described in detail with reference to the drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
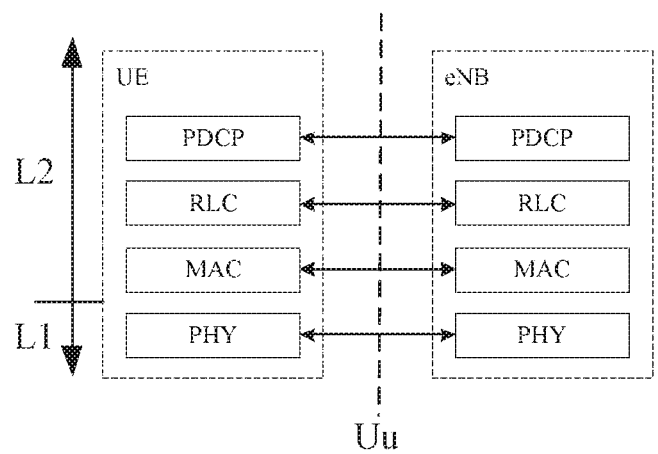
FIG. 1 is architecture of a user plane protocol stack of a radio interface (Uu interface) of a LTE system in the related art according to the present disclosure.
Figure 2:
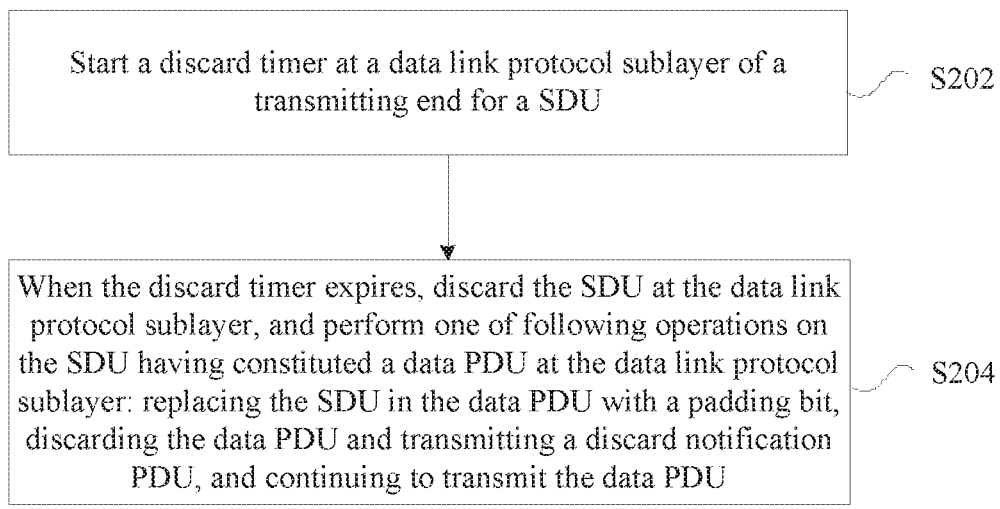
FIG. 2 is a flowchart of a congestion processing method according to an embodiment of the present disclosure.

An embodiment of the present disclosure provides a congestion processing method. FIG. 2 is a flowchart of a congestion processing method according to an embodiment of the present disclosure. As shown in FIG. 2, the process of the method includes the steps described below.

In step S202, a discard timer at a data link protocol sublayer of a transmitting end is started for a service data unit (SDU).

In step S204, when the discard timer expires, the SDU at the data link protocol sublayer is discarded, and one of following operations is performed on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

In the above steps, the discard timer at the data link protocol sublayer of the transmitting end is started for the SDU. When the discard timer expires, the SDU at the data link protocol sublayer is discarded, and one of following operations is performed on the SDU having constituted the data PDU at the data link protocol sublayer: replacing the SDU in the data PDU with the padding bit, discarding the data PDU and transmitting the discard notification PDU, and continuing to transmit the data PDU. The function of actively discarding a data packet of the transmitting end is implemented, achieving matching between the transmission rate of upper layer data and the transmission rate of radio link.

In an embodiment, the execution object of the steps described above may be a data transmitting end, such as a base station, a terminal and a transmitter, but it is not limited to this.

In an embodiment, the data link protocol sublayer is a highest data link protocol sublayer L2-H. The L2-H includes at least one function of a group consisting of: header compression and decompression, security, retransmission, reordering and duplicate packet detection.

This embodiment will be described below in detail in conjunction with related design concepts in the related art, one of a possible L2 protocol stack reconfiguration design ideas in the 5G era is to combine the function of "non-high processing time requirement" in the RLC layer and the function of the PDCP layer into one protocol sublayer for implementation, and the function of "high processing time requirement" in the RLC layer may be considered, according to different requirements, to be combined with the function of the MAC layer into one protocol sublayer for implementation, or an independent protocol sublayer continues to be maintained to implement these functions.

Figure 3:
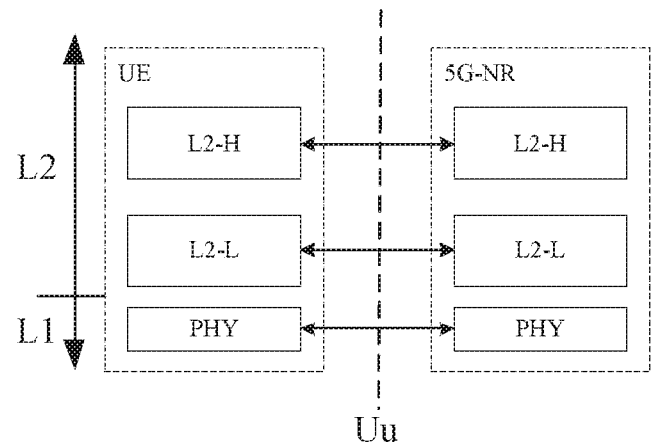
FIG. 3 is architecture of a user plane protocol stack of a 5G-NR radio interface according to an embodiment of the present disclosure.

FIG. 3 is architecture of a user plane protocol stack of a 5G-NR radio interface according to an embodiment of the present disclosure. As shown in FIG. 3, the L2 of the 5G-NR includes two protocol sublayers: the L2-high (abbreviated as L2-H and called as the highest data link protocol sublayer) and the L2-Low (abbreviated as L2-L and called as the lowest data link protocol sublayer). The L2-H includes, but is not limited to the function of the PDCP layer, and part or all of function of "non-high processing time requirement" of the RLC layer in the related LET technology. Here, the part of the function of "non-high processing time requirement" at least includes functions of retransmission (implemented by an ARQ), reordering and duplicate packet detection. The L2-H combines and designs the functions of retransmission, reordering and duplicate packet detection of the PDCP and RLC layers, and only leaves one layer of the functions of retransmission, reordering and duplicate packet detection. The L2-L includes, but is not limited to the function of the MAC layer and the function of "high processing time requirement" of the RLC layer in the related LET technology.

Figure 4:
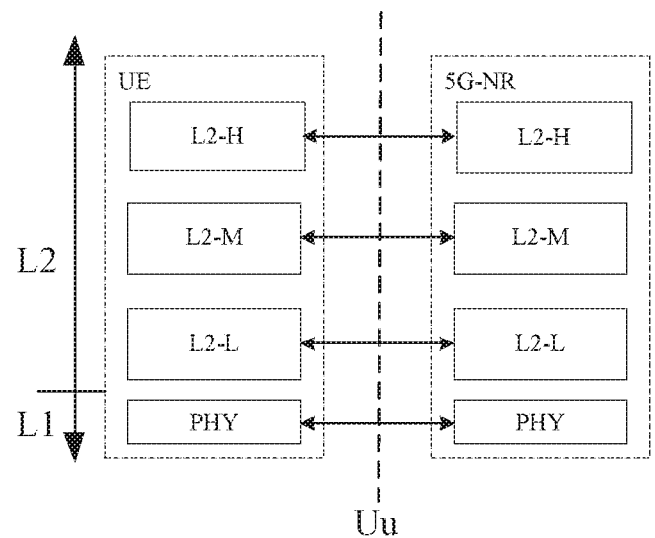
FIG. 4 is architecture of a user plane protocol stack of another 5G-NR radio interface according to an embodiment.

FIG. 4 is architecture of a user plane protocol stack of another 5G-NR radio interface according to an embodiment. As shown in FIG. 4, the L2 of the 5G-NR includes three protocol sublayers: the L2-high (abbreviated as L2-H and called as the highest data link protocol sublayer), the L2-Middle (abbreviated as L2-M and called as the middle data link protocol sublayer) and the L2-Low (abbreviated as L2-L and called as the lowest data link protocol sublayer). The L2-H includes, but is not limited to the function of the PDCP layer, and part or all of the function of "non-high processing time requirement" of the RLC layer in the related LET technology. Here, the part of the function of "non-high processing time requirement" at least includes the functions of retransmission (which may be implemented by the ARQ), reordering and duplicate packet detection. The L2-H combines and designs the functions of retransmission, reordering and duplicate packet detection of the PDCP and RLC layers, and only leaves one layer of the functions of retransmission, reordering and duplicate packet detection. The L2-M includes, but is not limited to remaining functions other than the functions of retransmission, reordering and duplicate packet detection of the RLC layer in the related LET technology. These remaining functions in the 5G-NR do not exclude the need to be modified and designed according to the new architecture of the user plane protocol stack of the radio interface and new requirements of 5G. The L2-L includes, but is not limited to, the function of the MAC layer in the related LTE technology.

The L2-H may support, according to different traffic or information transmission requirements, three data processing modes: an AM mode, an UM mode and a TM mode. For the AM mode, when the L2-H is used on a receiving device, in addition to a case of L2-H reconstruction, data transmitted to an upper layer after processed by the receiving device needs to ensure sequential and continuous. Here, the upper layer protocol layer of the L2-H may specifically be an L3 protocol layer or a transfer control protocol (TCP)/Internet protocol (IP) layer, or an application layer, or in when the 5G-NR uses an architecture other than architecture of the user plane protocol stack of the radio interface shown in FIGS. 3 and 4, the upper layer of the L2-H may also be other L2 protocol sublayers. The congestion processing method in the present disclosure may be used in the three data processing modes described above, and especially applied to the AM mode, which can effectively achieve matching between the transmission rate of the upper layer data and the transmission rate of radio link under the AM mode.

The congestion processing method of this embodiment is applied to the L2-H sublayer in FIGS. 3 and 4. The L2-H sublayer may be located on a user equipment or a radio network device using the 5G-NR. It is to be noted that the radio network device using the 5G new technology (abbreviated as 5G-NR in the following description of the present disclosure) may be an independent network, and may also be a combination network with a radio network device using other radio access technologies (RAT) such as the LTE and wireless local area network (WLAN). The radio network device in the present disclosure is a device for implementing the base station function, and its specific existence form on physical apparatus is not limited. For example, the device may be an integrated base station. That is, one apparatus includes all base station functions such as a base band function, and a radio frequency function. The device may also be a base band unit (BBU) and a remote radio unit (RRU) physically separated from each other. The base band function is implemented on the BBU and the radio frequency function is implemented on the RRU. The device may also be a central unit (CU) and a distributed unit (DU) physically separated from each other. Part or all of base band function and a control function for various radio protocol layers on the CU and DU are implemented on the CU. Part of base band function and/or the radio frequency function are implemented on the DU. When the data processing method of the present disclosure is applied to the L2-H of the 5G-NR, in physical, the L2-H may be located in the integrated base station described above, or in the BBU or the CU. In an embodiment, the step in which the discard timer at the data link protocol sublayer of the transmitting end is started for the SDU.

In step S11, after a SDU coming from an upper layer is received at the data link protocol sublayer, the discard timer for the SDU is started.

In step S12, after a concatenation operation is performed at the data link protocol sublayer, the discard timer for a concatenated data SDU is started. A concatenation function for the SDU coming from the upper layer is included at the data link protocol sublayer.

The upper layer includes at least one of: a network layer L3, a transmission control protocol (TCP)/Internet protocol (IP) layer, an application layer, or a sublayer other than the data link protocol sublayer in a data link layer.

In an implementation mode of this embodiment, if the concatenation function for the SDU coming from the upper layer is included at the data link protocol sublayer, the SDU is a concatenated SDU; and if the concatenation function is not included at the data link protocol sublayer, the SDU is the SDU coming from the upper layer.

In an embodiment, replacing the SDU in the data PDU with the padding bit includes: replacing a data field for the SDU in the data PDU with a preset padding bit. The padding bit may all be, according to the protocol, 0 or 1, but other filling means are not excluded.

In an implementation mode of this embodiment, replacing the SDU in the data PDU with the padding bit includes the steps described below.

In step S21, whether the data PDU including the SDU has been delivered from the data link protocol sublayer to a lower protocol sublayer before the discard timer expires is determined.

In step S22, if the data PDU including the SDU has been delivered from the data link protocol sublayer to the lower protocol sublayer before the discard timer expires, in a case where the discard timer expires, the SDU in the data PDU is replaced with the padding bit at the data link protocol sublayer and the lower protocol sublayer is indicated to discard the data PDU.

In this embodiment, the discard notification PDU includes a sequence number of the data PDU and is used for indicating that the data PDU corresponding to the sequence number has been discarded by the transmitting end.

In an implementation mode of this embodiment, discarding the data PDU and transmitting the discard notification PDU includes: discarding the data PDU at the data link protocol sublayer, and notifying the lower protocol sublayer of the data link protocol sublayer of discarding the data PDU.

In an implementation mode of this embodiment, after continuing to transmit the data PDU, the method further includes: discarding a preset number of SDUs behind the SDU at the data link protocol sublayer. In an embodiment, the preset number of SDUs may be one or more.

Figure 5:
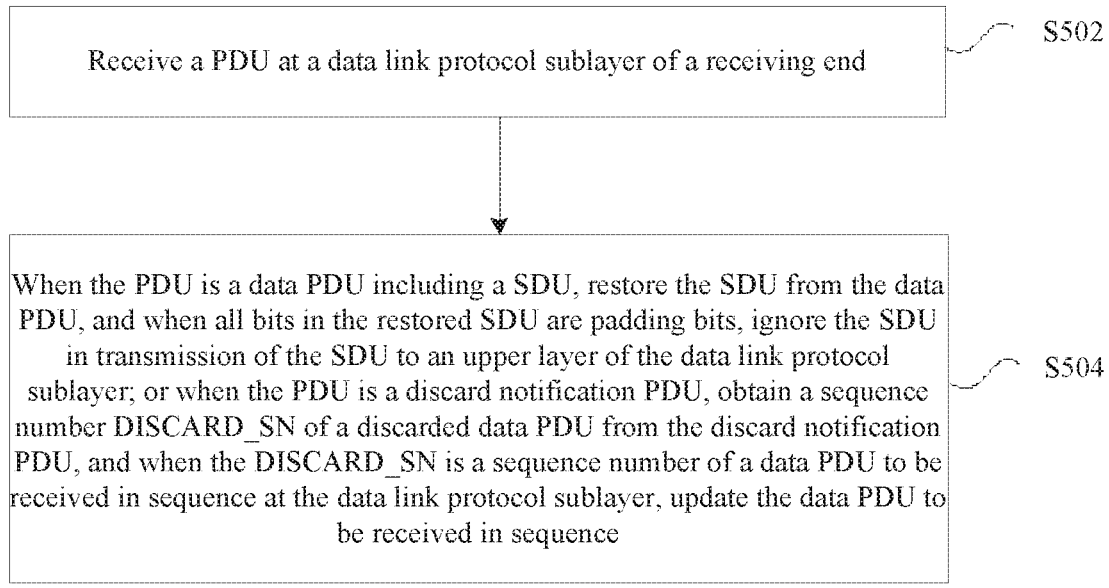
FIG. 5 is a flowchart of another congestion processing method according to an embodiment of the present disclosure.

An embodiment of the present disclosure provides another congestion processing method. FIG. 5 is a flowchart of another congestion processing method according to an embodiment of the present disclosure. As shown in FIG. 5, the process of the method includes the steps described below.

In step S502, a protocol data unit (PDU) at a data link protocol sublayer of a receiving end is received.

In step S502, when the PDU is a data PDU including a service data unit (SDU), the SDU is restored from the data PDU, and if all bits in the restored SDU are padding bits, the SDU is ignored in transmission of the SDU to an upper layer of the data link protocol sublayer; or when the PDU is a discard notification PDU, a sequence number DISCARD_SN of a discarded data PDU is obtained from the discard notification PDU, and if the DISCARD_SN is a sequence number of a data PDU to be received in sequence at the data link protocol sublayer, the data PDU to be received in sequence is updated.

In an implementation mode of this embodiment, the SDU is restored from the data PDU includes:

In step S31, a PDU header of the data PDU is removed to obtain the SDU.

In step S32, the PDU header of the data PDU is removed and at least one operation of integrity verification, decryption or decompression is performed to obtain the SDU.

In this embodiment, the step in which the SDU is ignored in transmission of the SDU to the upper layer of the data link protocol sublayer includes giving up delivering the SDU to the upper layer of the data link protocol sublayer in the transmission of the SDU to the upper layer of the data link protocol sublayer.

In an implementation mode of this embodiment, the step in which the data PDU to be received in sequence is updated includes updating a receiving window; and after the receiving window is updated, delivering a SDU, which is restored from a data PDU having a sequence number less than the sequence number of the updated data PDU to be received in sequence and has not been delivered to the upper layer of the data link protocol sublayer in sequence. In an embodiment, the sequence number of the receiving window is greater than or equal to a receiving state variable and is less than the maximum value of the receiving state variable, the receiving state variable is used for recording the sequence number of the data PDU to be received in sequence, the value of the receiving state variable is equal to the value of the sequence number of the data PDU to be received in sequence and the maximum value of the receiving state variable is equal to the value of the receiving state variable plus a preset size of the receiving window.

Updating the receiving window in this embodiment includes: updating the value of the receiving state variable with a sequence number of a data PDU to be received in sequence behind the data PDU corresponding to the DISCARD_SN, and updating a maximum value of the receiving state variable based on the updated value of the receiving state variable. The receiving state variable is used for recording the sequence number of the data PDU to be received in sequence, and the maximum value of the receiving state variable is equal to the value of the receiving state variable plus the preset size of the receiving window. The step in which the data PDU to be received in sequence is updated further includes: after the receiving window is updated, if the updated value of the receiving state variable is less than the value before the updating, updating a receiving hyper-frame number RX_HFN.

In an implementation mode of this embodiment, as another possible case, if the DISCARD_SN is not the sequence number of the data PDU to be received in sequence of the data link protocol sublayer, the discard notification PDU is ignored.

From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the present disclosure substantially, or the part contributing to the related art, may be embodied in the form of a software product. The computer software product is stored in a storage medium (such as a read-only memory (ROM)/random access memory (RAM), a magnetic disk or an optical disk) and includes instructions for enabling a terminal device (which may be a mobile phone, a computer, a server, a network device, or the like) to execute the method according to each embodiment of the present disclosure.

Embodiment Two

This embodiment further provides a congestion processing apparatus and system. The apparatus is used for implementing the above-mentioned embodiments. What has been described will not be repeated. As used below, the term "module" may be software, hardware or a combination thereof capable of implementing predetermined functions. The apparatus in the embodiments described below is implemented by software, but implementation by hardware or by a combination of software and hardware is also possible and conceived.

This embodiment provides a congestion processing apparatus, applied to a transmitting end. The apparatus includes a starting module and a processing module. The starting module is configured to start a discard timer at a data link protocol sublayer for a service data unit (SDU). The processing module is configured to, when the discard timer expires, discard the SDU at the data link protocol sublayer, and perform one of following operations on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

In an embodiment, the data link protocol sublayer is a protocol sublayer L2-H. The L2-H includes at least one function of a group consisting of: header compression and decompression, security, retransmission, reordering and duplicate packet detection.

In an embodiment, a starting module in this embodiment includes a first starting unit or a second staring unit. The first starting unit is configured to after a SDU coming from an upper layer is received at the data link protocol sublayer, start the discard timer for the SDU. The second starting unit is configured to after a concatenation operation is performed at the data link protocol sublayer, start the discard timer for a concatenated data SDU. The data link protocol sublayer includes a concatenation function for the SDU coming from the upper layer. The upper layer includes at least one of: a network layer L3, a transmission control protocol (TCP)/Internet protocol (IP) layer, an application layer, or a sublayer other than the data link protocol sublayer in a data link layer.

In an implementation mode of this embodiment, if the concatenation function for the SDU coming from the upper layer is included at the data link protocol sublayer, the SDU is a concatenated SDU; and if the concatenation function is not included at the data link protocol sublayer, the SDU is the SDU coming from the upper layer.

The step in which the processing module replaces the SDU in the data PDU with the padding bit may specifically include: replacing a data field for the SDU in the data PDU with a preset padding bit.

In an embodiment, replacing the SDU in the data PDU with the padding bit includes: if the data PDU including the SDU has been delivered from the data link protocol sublayer to a lower protocol sublayer before the discard timer expires, when the discard timer expires, replacing the SDU in the data PDU with the padding bit at the data link protocol sublayer, and indicating the lower protocol sublayer to discard the data PDU.

In an embodiment, the discard notification PDU includes a sequence number of the data PDU and is used for indicating that the data PDU corresponding to the sequence number has been discarded by the transmitting end.

In an embodiment, the step in which the processing module discards the data PDU and transmits the discard notification PDU includes: discarding the data PDU at the data link protocol sublayer, and notifying the lower protocol sublayer of the data link protocol sublayer of discarding the data PDU.

In an embodiment, after continuing to transmit the data PDU, the processing module is further configured discarding a preset number of SDUs behind the SDU at the data link protocol sublayer.

This embodiment provides another congestion processing apparatus, applied to a receiving end. The apparatus includes a receiving module and a processing module. The receiving module is configured to receive a protocol data unit (PDU) at a data link protocol sublayer. The processing module is configured to: when the PDU is a data PDU including a service data unit (SDU), restore the SDU from the data PDU, and if all bits in the restored SDU are padding bits, ignore the SDU in transmission of the SDU to an upper layer of the data link protocol sublayer; or when the PDU is a discard notification PDU, obtain a sequence number DISCARD_SN of a discarded data PDU from the discard notification PDU, and if the DISCARD_SN is a sequence number of a data PDU to be received in sequence at the data link protocol sublayer, update the data PDU to be received in sequence.

In an implementation mode of this embodiment, the step in which the processing module updates the data PDU to be received in sequence includes updating a receiving window, after the receiving window is updated, delivering a SDU, which is restored from a data PDU having a sequence number less than the sequence number of the updated data PDU to be received in sequence and has not been delivered to the upper layer of the data link protocol sublayer in sequence; In an embodiment, the sequence number of the receiving window is greater than or equal to a receiving state variable and is less than the maximum value of the receiving state variable, the receiving state variable is used for recording the sequence number of the data PDU to be received in sequence, the value of the receiving state variable is equal to the value of the sequence number of the data PDU to be received in sequence and the maximum value of the receiving state variable is equal to the value of the receiving state variable plus a preset size of the receiving window.

In an embodiment, updating the receiving window includes: updating the value of the receiving state variable with a sequence number of a data PDU to be received in sequence behind the data PDU corresponding to the DISCARD_SN, and updating a maximum value of the receiving state variable based on the updated value of the receiving state variable. The receiving state variable is used for recording the sequence number of the data PDU to be received in sequence, and the maximum value of the receiving state variable is equal to the value of the receiving state variable plus the preset size of the receiving window.

In an implementation mode of this embodiment, the step in which the data PDU to be received in sequence is updated further includes: after the receiving window is updated, if the updated value of the receiving state variable is less than the value before the updating, updating a receiving hyper-frame number RX_HFN.

In an embodiment, the processing module is further configured to, if the DISCARD_SN is not the sequence number of the data PDU to be received in sequence at the data link protocol sublayer, ignore the discard notification PDU.

In an embodiment, the step in which the processing module restores the SDU from the data PDU includes: removing a PDU header of the data PDU to obtain the SDU; or removing the PDU header of the data PDU and performing at least one operation of integrity verification, decryption or decompression to obtain the SDU.

In this embodiment, ignoring the SDU in transmission of the SDU to the upper layer of the data link protocol sublayer includes: giving up delivering the SDU to the upper layer of the data link protocol sublayer in the transmission of the SDU to the upper layer of the data link protocol sublayer.

Figure 6:
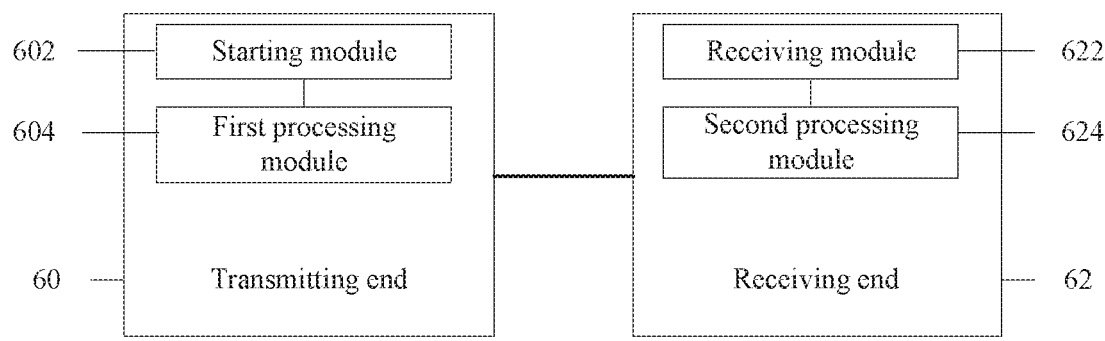
FIG. 6 is a block diagram of a congestion processing system according to an embodiment of the present disclosure.

FIG. 6 is a block diagram of a congestion processing system according to an embodiment of the present disclosure. As shown in FIG. 6, the system includes: a transmitting end 60 and a receiving end 62. The transmitting end 60 includes a starting module 602 and a first processing module 604. The starting module 602 is configured to start a discard timer at a data link protocol sublayer for a service data unit (SDU). The first processing module 604 is configured to discard, when the discard timer expires, the SDU at the data link protocol sublayer, and perform one of following operations on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

The receiving end 62 includes a receiving module 622 and a second processing module 624. The receiving module 622 is configured to receive a protocol data unit (PDU) at a data link protocol sublayer. The second processing module 624 is configured to: when the PDU is a data PDU including a service data unit (SDU), restore the SDU from the data PDU, and if all bits in the restored SDU are padding bits, ignore the SDU in transmission of the SDU to an upper layer of the data link protocol sublayer; or when the PDU is a discard notification PDU, obtain a sequence number DISCARD_SN of a discarded data PDU from the discard notification PDU, and if the DISCARD_SN is a sequence number of a data PDU to be received in sequence at the data link protocol sublayer, update the data PDU to be received in sequence.

In an embodiment, the data link protocol sublayer is a protocol sublayer L2-H. The L2-H includes at least one function of a group consisting of: header compression and decompression, security, retransmission, reordering and duplicate packet detection.

It should be noted that the various modules described above may be implemented by software or hardware. Implementation by hardware may, but may not necessarily, be performed in the following manner: the various modules described above are located in a same processor, or the various modules described above are located in their respective processors in any combination form.

Embodiment Three

This embodiment is an embodiment of the present disclosure. A detailed description of the present application is given below in conjunction with specific scenarios.

The present disclosure provides a congestion processing method for implementing the data packet active discarding of a transmitting end and achieving matching between the transmission rate of upper layer data and the transmission rate of radio link in the design of new L2 protocol of 5G.

The congestion processing method provided by the present disclosure includes a congestion processing of the transmitting end and a congestion processing of the receiving end.

Figure 7:
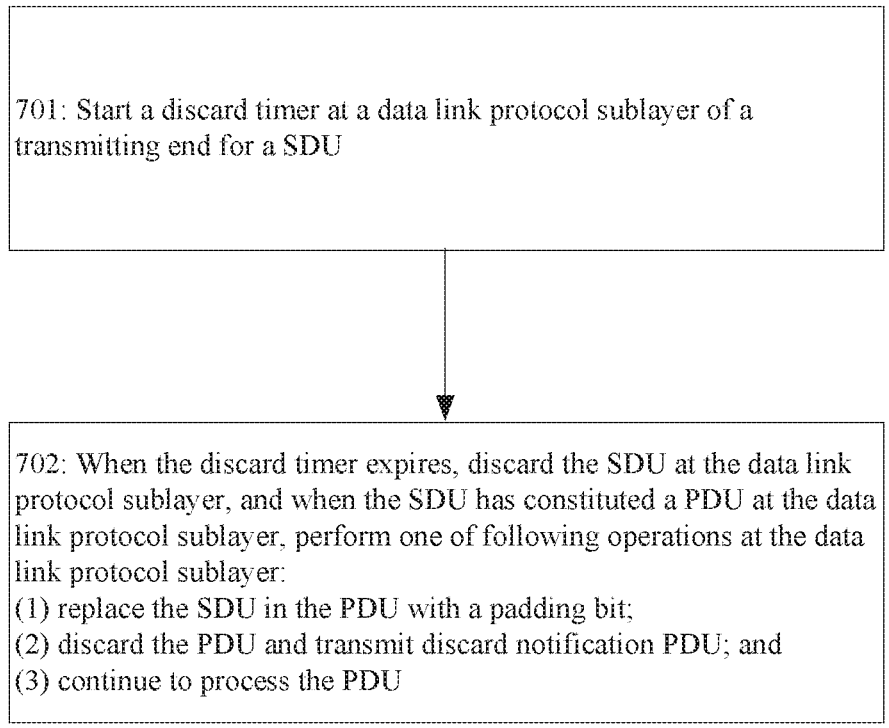
FIG. 7 is a flowchart of a congestion processing method of a transmitting end according to an embodiment.

FIG. 7 is a flowchart of a congestion processing method of a transmitting end according to this embodiment. The method includes the steps described below.

In step 701, a discard timer is started at a data link protocol sublayer of a transmitting end for a SDU.

The data link protocol sublayer is a protocol sublayer of layer 2 (L2), such as L2-H.

After a SDU coming from an upper layer is received at the data link protocol sublayer, the discard timer for the SDU is started; or if the concatenation function for the SDU coming from the upper layer is included at the data link protocol sublayer, after a concatenation operation is performed at the data link protocol sublayer, the discard timer for a concatenation SDU is started.

The concatenation function for the SDU coming from the upper layer refers to concatenate more than one SDU coming from the upper layer into one large SDU, called a concatenated SDU.

The upper layer of the data link protocol sublayer may specifically be an L3 protocol layer, a TCP/IP layer, an application layer, or when the 5G-NR uses an architecture other than the architecture of the user plane protocol stack of the radio interface shown in FIGS. 3 and 4, the upper layer of the L2-H may also be other L2 protocol sublayers.

In step 702, when the discard timer expires, the SDU is discarded at the data link protocol sublayer, and when the SDU has constituted a PDU at the data link protocol sublayer, one of following operations is performed at the data link protocol sublayer:

(1) replacing the SDU in the PDU with at least one padding bit;

(2) discarding the PDU and transmitting a discard notification PDU; and (3) continuing to process the PDU.

If the concatenation function for the SDU coming from the upper layer is included at the data link protocol sublayer, the SDU is a concatenated SDU; and if the concatenation function is not included at the data link protocol sublayer, the SDU is the SDU coming from the upper layer.

Replacing the SDU in the PDU with the padding bit refers to replacing a data field for the SDU in the PDU with the padding bit. The padding bit may all be, according to the protocol, 0 or 1, but other filling means are not excluded.

Replacing the SDU in the PDU with the padding bit further includes: if the PDU including the SDU has been delivered from the data link protocol sublayer to a lower protocol sublayer before the discard timer expires, when the discard timer expires, the lower protocol sublayer is indicated to discard the PDU at the data link protocol sublayer. Here, the lower protocol sublayer of the data link protocol sublayer refers to a protocol layer under the L2-H, such as the L2-L in FIG. 3 and the L2-M in FIG. 4.

The discard notification PDU includes a sequence number of the discarded PDU (in the present disclosure, the sequence number of the discarded PDU is marked as DISCARD_SN) and is used to notify the receiving end that the PDU whose sequence number equals to the sequence number indicated by the discard notification PDU is discarded by the transmitting end.

The discard notification PDU includes discarding the PDU at the data link protocol sublayer, and notifying the lower protocol sublayer of the data link protocol sublayer of discarding the PDU.

Continuing to process the PDU includes continuing to transmit and/or retransmit the PDU.

When the discard timer expires, the SDU is discarded at the data link protocol sublayer, and if the SDU has constituted the PDU at the data link protocol sublayer, the data link protocol sublayer continues to process the PDU. Continuing to process the PDU may further include that the following one or more SDUs after the SDU are discarded at the data link protocol sublayer.

Figure 8:
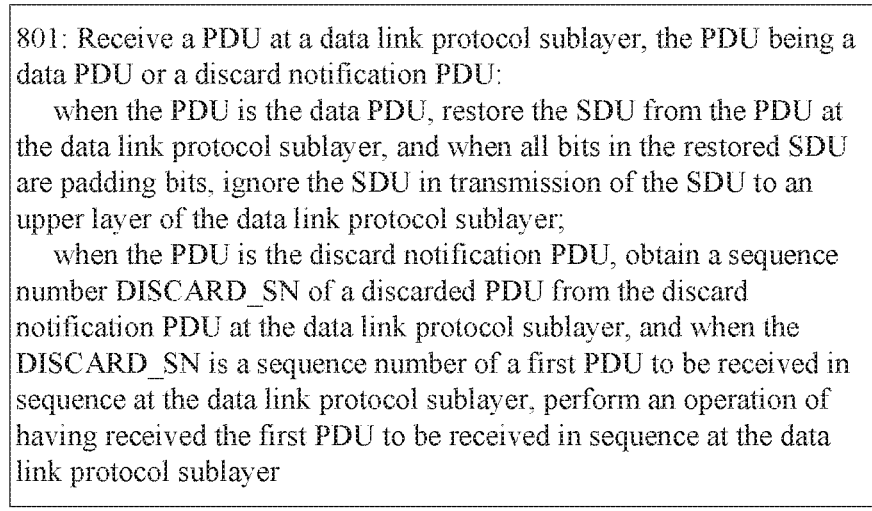
FIG. 8 is a flowchart of a congestion processing method of a receiving end according to an embodiment.

FIG. 8 is a flowchart of a congestion processing method of a receiving end according to this embodiment. The method includes the steps described below.

In step 801, a PDU is received at a data link protocol sublayer. The PDU is a data PDU or a discard notification PDU.

When the PDU is the data PDU, the SDU is restored from the PDU at the data link protocol sublayer, and if all bits in the restored SDU are padding bits, the SDU is ignored in transmission of the SDU to an upper layer of the data link protocol sublayer.

Restoring the SDU from the PDU includes: removing a PDU header of the PDU to obtain the SDU; or removing the PDU header of the data PDU and performing at least one operation of integrity verification, decryption or decompression to obtain the SDU.

Ignoring the SDU in transmission of the SDU to the upper layer of the data link protocol sublayer refers to not deliver the SDU in transmission of the SDU to the upper layer of the data link protocol sublayer.

When the PDU is the discard notification PDU, a sequence number DISCARD_SN of a discarded PDU is obtained from the discard notification PDU at the data link protocol sublayer, and if the DISCARD_SN is a sequence number of a PDU to be received in sequence at the data link protocol sublayer, an operation, which is equivalently to having received the PDU to be received in sequence, is performed at the data link protocol sublayer. That is, the operation of updating the PDU to be received in sequence in the present disclosure.

If the DISCARD_SN is the sequence number of the PDU to be received in sequence at the data link protocol sublayer, the PDU to be received in sequence is updated at the data link protocol sublayer, the operation at least includes: updating a receiving window; and after the receiving window is updated, delivering a SDU, which is restored from a PDU before the updated data PDU to be received in sequence and has not been delivered, to the upper layer in sequence. That is, after the receiving window is updated, a SDU, which is restored from a data PDU having a sequence number less than the sequence number of the updated data PDU to be received in sequence and has not been delivered, is delivered to the upper layer in sequence. The operation may further include: if the SDU needs to be decrypted according to configuration (configured by a control plane), after the receiving window is updated, determining that whether a receiving hyper-frame number RX_HFN needs to be updated. If the receiving hyper-frame number RX_HFN needs to be updated, then the RX_HFN is updated, and the operation of RX_HFN=RX_HFN+1 is performed.

Here, the receiving window is VR(R)<=RSN<VR(MR), when a receiving sequence number (RSN) of a receiving PDU satisfies VR(R)<=RSN<VR(MR), the receiving PDU is considered to be within the receiving window, otherwise, the receiving PDU is considered to be outside the receiving window. VR(R) is a receiving state variable for recording the RSN of the PDU to be received in sequence. Or in other words, the receiving state variable is used for recording the RSN of a next PDU behind a preceding PDU which is successfully received in sequence; VR(MR) is the maximum receiving state variable, and VR(MR)=VR(R)+Window_Size, where Window_Size is the preset size of the receiving window.

Updating the receiving window refers to updating the VR(R) and VR(MR). Specifically, updating a value of VR(R) with the RSN of the PDU to be received in sequence, and accordingly updating the VR(MR) based on the updated VR(R).

Determining whether the RX_HFN needs to be updated includes: determining whether the updated VR(R) is inverted relative to the VR(R) before the updating. When the updated VR(R) is inverted, then the RX_HFN is updated.

Determining whether the updated VR(R) is inverted relative to the VR(R) before the updating refers to determining whether a value of the updated VR(R) is less than a value of the VR(R) before the updating. It may specifically be whether a determination condition VR(RO)−VR(RN)>VR(MRN)−VR(RN) is satisfied. When the determination condition is satisfied, then the updated VR(R) is inverted, otherwise, the updated VR(R) is not inverted. Here, VR(RO) is the VR(R) before the updating, the VR(RN) is the updated VR(R), and the VR(MRN) is the updated VR(MR).

It is to be noted that the determination condition VR(RO)−VR(RN)>VR(MRN)−VR(RN) described above needs to perform a modulus operation in specific calculation. For example, the actual calculation is performed according to:

$$[VR(RO)-VR(RN)]\% \text{ Window\_Size} > [VR(MRN)-VR(RN)]\% \text{ Window\_Size}.$$

The congestion processing method of the receiving end further includes that, if the DISCARD_SN is not the SN of the PDU to be received in sequence at the data link protocol sublayer, the discard notification PDU is ignored at the data link protocol sublayer.

This embodiment further includes two specific embodiments.

Specific Embodiment One

The processing of replacing a SDU with a padding bit in a PDU of a transmitting end and receiving the PDU of a receiving end when the discard timer expires will be described in detail in embodiment 1.

The transmitting end performs processing as described below.

A data link protocol sublayer L2-H of the transmitting end receives SDUs coming from an upper layer, and starts a discard timer for each SDU. In this embodiment, it is assumed that the L2-H receives SDU-x, SDU-y, and SDU-z coming from the upper layer in sequence. The discard timer started for the SDU-x is Dtimer-x.

Figure 9:
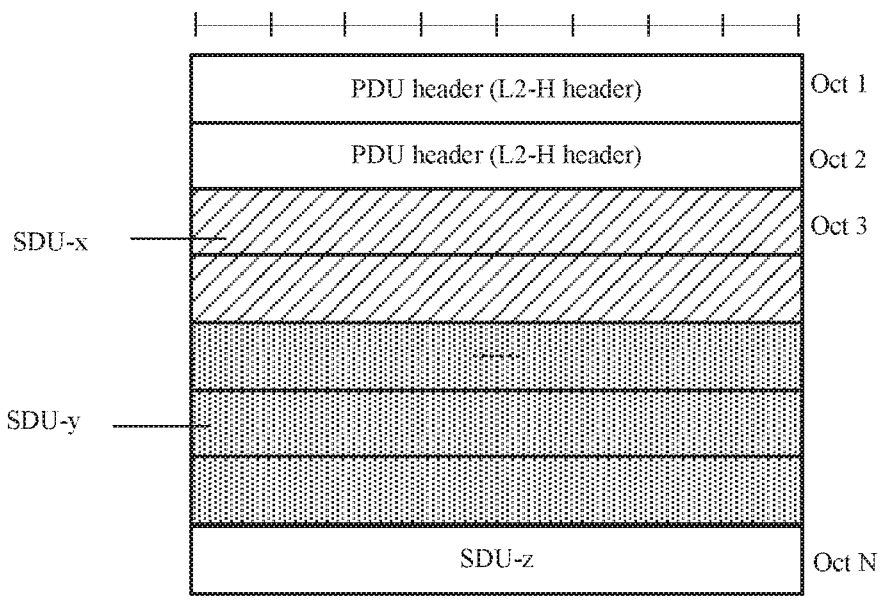
FIG. 9 is a schematic diagram of a PDU-x according to embodiment 1.

In this embodiment, before the Dtimer-x, the L2-H of the transmitting end has constituted the SDU-x, SDU-y, and SDU-z into one PDU (PDU-x). FIG. 9 is a schematic diagram of the PDU-x according to embodiment 1. FIG. 9 is a schematic diagram of the PDU. The PDU-x includes a PDU header (L2-H header), SDU-x, SDU-y and SDU-z. The L2-H header includes group packet information of the PDU, such as the SN and lengths of various SDUs. It is to be noted that the FIG. 9 is the schematic diagram of only one PDU of this embodiment, and the lengths of the L2-H header and various SDUs are not limited in actual use.

When the Dtimer-x expires, the SDU-x and PDU-x are still saved in the L2-H of the transmitting end. For example, before the Dtimer-x expires, the L2-H of the transmitting end has not received acknowledgement information on correct reception of the PDU in FIG. 9 coming from an opposite end or a lower protocol sublayer of the L2-H, the SDU-x and PDU-x are still saved in the L2-H of the transmitting end.

Figure 10:
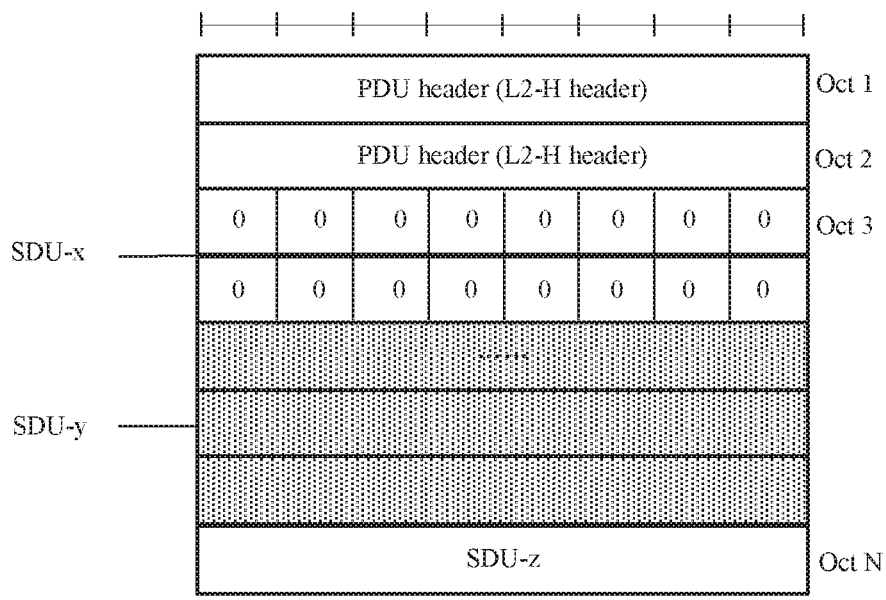
FIG. 10 is a schematic diagram of a PDU-x' according to embodiment 1.

When the Dtimer-x expires, the L2-H of the transmitting end discards the SDU-x, and replaces all information of the SDU-x in the PDU-x with the padding bit. In this embodiment, the padding bit is 0. FIG. 10 is a schematic diagram of a PDU-x' according to embodiment 1, as shown in FIG. 10, this embodiment shows a schematic diagram of a packet (PDU-x') in which the SDU-x in the PDU-x is replaced with the padding bit.

In this embodiment, when the Dtimer-x expires, the PDU-x has been delivered to the lower protocol layer of the L2-H, this embodiment further includes: the L2-H notifies the lower protocol sublayer to discard PDU-x.

Figure 11:
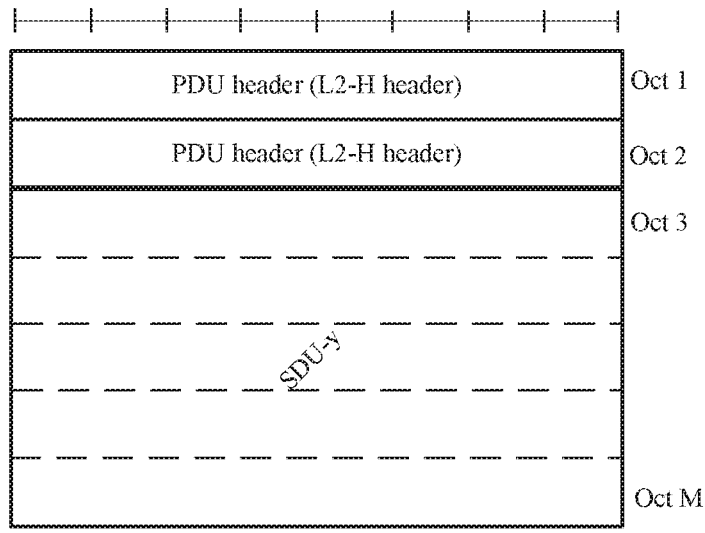
FIG. 11 is a schematic diagram of a PDU-m according to embodiment 1.

It is to be noted that in the specific embodiment one, when the L2-H supports the concatenation function, the processing of the transmitting end includes:

The data link protocol sublayer L2-H of the transmitting end receives the SDU-x, SDU-y, and SDU-z coming from the upper layer in sequence and concatenates the SDU-x, SDU-y, and SDU-z into a big SDU, i.e., SDU-m. Then the L2-H starts the discard timer Dtimer-m for the SDU-m. In this embodiment, the concatenation refers to concatenate the SDU-x, SDU-y, and SDU-z into the SDU-m. The specific concatenation design is not the content of the present disclosure, and the specific concatenation format is not limited in this embodiment. FIG. 11 is a schematic diagram of a PDU-m according to embodiment 1. FIG. 11 is a schematic diagram of the PDU-m constituted from concatenating SDUs by the L2-H. Similarly, the length of the L2-H header is not limited in the present disclosure in actual use.

When the Dtimer-m expires, the transmitting end discards the SDU-m, and replaces all information of the SDU-m in the PDU-m with the padding bit. If the PDU-m has been delivered to the lower protocol layer of the L2-H before the Dtimer-m expires, the L2-H further notifies the lower protocol sublayer to discard PDU-m.

The receiving end performs processing as described below.

Figure 12:
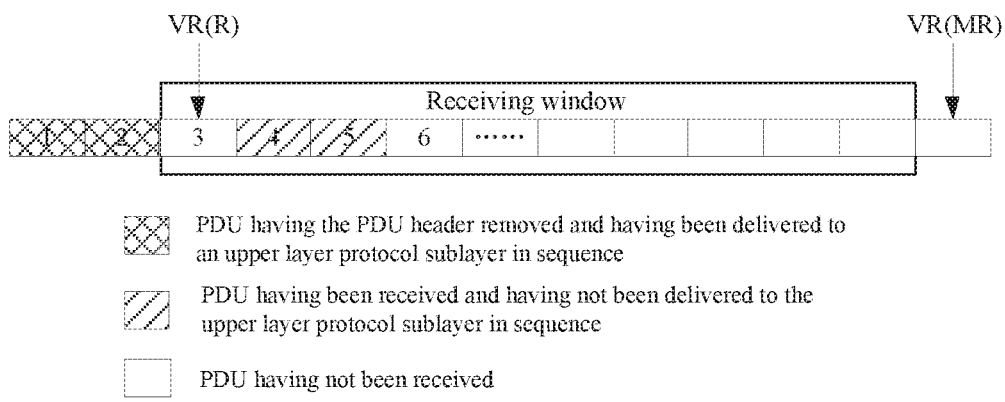
FIG. 12 is a schematic diagram of a receiving window maintained by a sublayer L2-H according to an embodiment.

A data link protocol sublayer L2-H of the receiving end maintains a receiving window. FIG. 12 is a schematic diagram of the receiving window maintained by the data link protocol sublayer L2-H of the receiving end in this embodiment. FIG. 12 is a schematic diagram of the receiving window maintained by the L2-H in this embodiment. The L2-H maintains the receiving window through a receiving sequence number (RSN) and a serial of state variables. When the RSN satisfies VR(R)<=RSN<VR(MR), the RSN is considered to be within the receiving window; otherwise, the RSN is considered to be outside the receiving window.

VR(R) is a receiving state variable for recording the sequence number of the PDU to be received in sequence. In other words, the receiving state variable is used for recording the RSN of a next PDU behind a preceding PDU which is successfully received in sequence. For example, in FIG. 12, PDUs with a RSN less than or equal to 2 have been received successfully, and the PDU with a RSN of 3 has not been received, then VR(R)=3.

Figure 13:
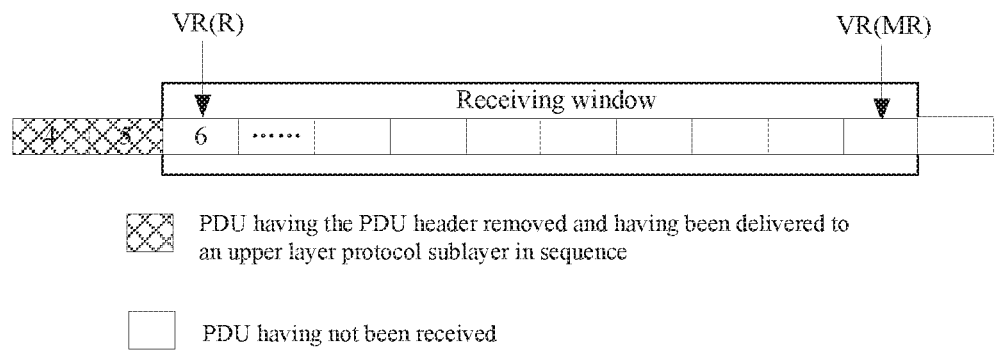
FIG. 13 is a schematic diagram of the updated receiving window maintained by a data link protocol sublayer according to an embodiment.

An initial value of VR(R) is 0. The VR(R) is updated after the PDU to be received in sequence is received successfully, i.e., a PDU with a RSN=VR(R) is received successfully. The value of the VR(R) is updated to the RSN of the PDU waiting to be received in sequence. For example, in FIG. 12, when the PDU with the RSN of 3 is received successfully, the VR(R) is updated to the RSN of the PDU needed to be received in sequence, i.e., the VR(R)=6. The updated receiving window is as shown in FIG. 13. FIG. 13 is a schematic diagram of the updated receiving window maintained by the data link protocol sublayer in this embodiment.

VR(MR) is the maximum value of the receiving state variable. VR(MR)=VR(R)+Window_Size. The value of the Window_Size is configured by a control plane to the L2-H, or is obtained according to parameters configured by the control plane to the L2-H, such as a maximum reception sequence number (Maximum_RSN). The specific calculation formula is, for example, Window_Size=(Maximum_RSN+1)/2.

The L2-H receives PDU-x' from the lower protocol sublayer, and determines whether the PDU-x' is within the receiving window. When the PDU-x' is within the receiving window, the PDU-x' is put into a receiving buffer; otherwise, the PDU-x' is discarded.

After the PDU-x' is put into the receiving buffer, the L2-H processes the PDU-x'. When the SDU-x, SDU-y and SDU-z are restored from the PDU-x', the SDU-x is determined to be the padding bit, then the transmitting end having discarded the SDU-x is determined. Therefore, when the SDU is delivered from the L2-H to the upper layer, the SDU-x is ignored. For example, in this embodiment, when the SDU is transmitted to the upper layer, the SDU-y and SDU-z is delivered in sequence.

It is to be noted that when the L2-H supports the concatenation function, the receiving end corresponding to the transmitting end performs processing as described below.

The data link protocol sublayer L2-H of the receiving end maintains the receiving window (similar to FIG. 12). The L2-H receives PDU-m' from the lower protocol sublayer, and determines whether the PDU-m' is within the receiving window. When the PDU-m' is within the receiving window, the PDU-m' is put into a receiving buffer; otherwise, the PDU-m' is discarded.

After the PDU-m' is put into the receiving buffer, the L2-H processes the PDU-m'. When the SDU-m is restored from the PDU-x', the SDU-m is determined to be the padding bit, then the transmitting end having discarded the SDU-x is determined. Therefore, when the SDU is delivered from the L2-H to the upper layer, the SDU-m is ignored.

In the method of the embodiment one, when the discard timer expires, the transmitting end discards the SDU. Through replacing the SDU in the PDU with the padding bit, on one hand, the receiving end can receive the PDU normally, the maintenance and processing of the receiving end window is simple and there is no need to introduce an exception handling. On the other hand, the receiving end can also determine that the transmitting end discards the SDU by the padding bit. When the SDU is delivered to the upper layer, the SDU is ignored, so that the fact of packet loss (and the congestion occurs) on the radio link of the transmitting end is transmitted to the upper layer of the transmitting end (such as a TCP layer), causing the upper layer to reduce the transmission rate and achieving matching between the transmission rate of upper layer data and the transmission rate of radio link in the design of new L2 protocol of 5G as shown in FIGS. 3 and 4.

Specific Embodiment Two

The processing of discarding a PDU including a SDU, transmitting a discard notification PDU at a transmitting end and receiving the discard notification PDU at a receiving end when the discard timer for the SDU expires will be described in detail in embodiment 2.

The processing of the transmitting end includes:

A data link protocol sublayer L2-H of the transmitting end receives SDU-x, SDU-y and SDU-z coming from an upper layer, and starts a discard timer for each SDU. The discard timer started for the SDU-x is Dtimer-x. Similar to the embodiment 1, the L2-H constitutes the three SDUs into one PDU (PDU-x), when the Dtimer-x expires, the SDU-x and PDU-x are still saved in the L2-H of the transmitting end.

Figure 14:
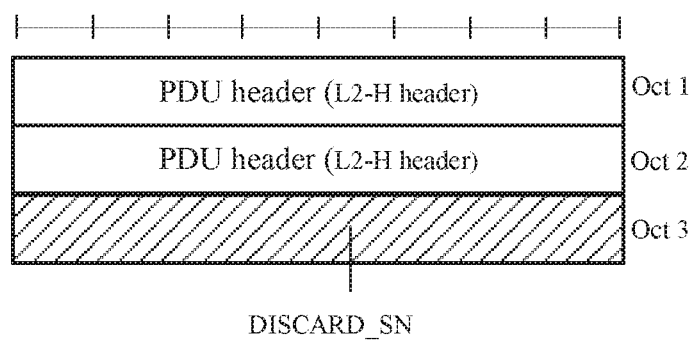
FIG. 14 is a schematic diagram of a discard notification PDU according to an embodiment.

When the Dtimer-m expires, the L2-H of the transmitting end discards the SDU-x and PDU-x. Here, when PDU-x has been delivered to the lower protocol layer, and the L2-H further notifies the lower protocol sublayer to discard PDU-x. At the same time, the L2-H transmits the discard notification PDU. FIG. 14 is a schematic diagram of the discard notification PDU in this embodiment. The discard notification PDU includes a sequence number (DISCARD_SN) of the discarded PDU (PDU-x) and a header of the discard notification PDU may also indicate the PDU is the discard notification PDU. It is to be noted that FIG. 14 only shows one embodiment of this embodiment, and the length of the L2-header and the DISCARD_SN in actual use is not limited, and that the PDU may further include other information is not limited.

It is to be noted that in the specific embodiment two, if the L2-H supports the concatenation function, the transmitting end performs processing as described below.

The data link protocol sublayer L2-H of the transmitting end has received the SDU-x, SDU-y, and SDU-z coming from the upper layer in sequence and concatenated the three SDUs into a big SDU, i.e., SDU-m. Then the L2-H starts the discard timer Dtimer-m for the SDU-m. In this embodiment, the L2-H constitutes the concatenated SDUs into a PDU-m.

When the Dtimer-m expires, the transmitting end discards the SDU-m and PDU-m, at the same time, the L2-H transmits the discard notification PDU. The discard notification PDU includes the SN (DISCARD_SN) of the discarded PDU (PDU-m).

The receiving end performs processing as described below.

A data link protocol sublayer L2-H of the receiving end maintains a receiving window (similar to FIG. 12). The L2-H receives the discard notification PDU from the lower protocol sublayer, and obtains the DISCARD_SN in the discard notification PDU. The L2-H determines whether the DISCARD_SN is the SN of the PDU to be received in sequence; if the DISCARD_SN is the SN of the PDU to be received in sequence, the L2-H performs a updating operation, which is equivalent to the case where the PDU to be received in sequence have received, at least including: updating the receiving window; and after the receiving window is updated, delivering the SDU, which is restored from a PDU before the updated data PDU to be received in sequence and has not been delivered, to the upper layer in sequence. The operation may further include: if the SDU needs to be decrypted according to configuration (configured by a control plane), after the receiving window is updated, whether a receiving hyper-frame number RX_HFN needs to be updated is determined. If the receiving hyper-frame number RX_HFN needs to be updated, then the RX_HFN is updated, and the operation of RX_HFN=RX_HFN+1 is performed.

Here, the receiving window is VR(R)<=RSN<VR(MR), when a receiving sequence number (RSN) of a receiving PDU satisfies VR(R)<=RSN<VR(MR), the receiving PDU is considered to be within the receiving window, otherwise, the receiving PDU is considered to be outside the receiving window. VR(R) is a receiving state variable for recording the RSN of the PDU to be received in sequence. In other words, for recording the RSN of a next PDU behind the preceding PDU which is successfully received. VR(MR)=VR(R)+Window_Size, where Window_Size is the size of the receiving window. The L2-H determines whether the DISCARD_SN is the SN of the PDU to be received in sequence, i.e., determines whether the DISCARD_SN equals to VR(R). If the DISCARD_SN equals to VR(R), the DISCARD_SN is the SN of the PDU to be received in sequence; otherwise, the DISCARD_SN is not the SN of the PDU to be received in sequence.

Here, updating the receiving window refers to updating the VR(R) and VR(MR). Specifically, a value of VR(R) is updated to the RSN of the PDU needed to be received in sequence behind the SN indicated by the DISCARD_SN, and the VR(MR) is updated accordingly based on the updated VR(R).

Here, determining that whether the RX_HFN needs to be updated includes: determining that whether the updated VR(R) is inverted relative to the VR(R) before the updating. When the updated VR(R) is inverted, then the RX_HFN is updated.

Determining whether the updated VR(R) is inverted relative to the VR(R) before the updating refers to determining whether a value of the updated VR(R) is less than a value of the VR(R) before the updating, which may specifically be:

determining whether a determination condition VR(RO)−VR(RN)>VR(MRN)−VR(RN) is satisfied. If the determination condition is satisfied, the updated VR(R) is inverted; otherwise, the updated VR(R) is not inverted. Here, VR(RO) is the VR(R) before the updating, the VR(RN) is the updated VR(R), and the VR(MRN) is the updated VR(MR).

This specific embodiment uses FIG. 12 as an example, before receiving the discard notification PDU, the state of the receiving window is shown in FIG. 12. PDUs with RSNs of 4 and 5 within the receiving window have been received successfully, but a PDU with a RSN of 3 has not been received successfully. The L2-H receives the discard notification PDU, and obtains a DISCARD_SN of 3 from the discard notification PDU, the DISCARD_SN of 3 is exactly the SN (3) of the PDU to be received in sequence of the receiving end, i.e. a value of a current VR(R), then the L2-H performs a updating operation, which is equivalent to having received the PDU with the RSN of 3, including updating the receiving window.

Updating the receiving window refers to updating the value of VR(R) to the RSN of the PDU needed to be received in sequence behind the SN (3) indicated by the DISCARD_SN, after the updating, the VR(R)=6, accordingly, the value of VR(R) is updated to: VR(MR)=6+Window_Size. The updated receiving window is as shown in FIG. 13.

After updating the receiving window, the L2-H delivers the SDU, which is restored from a PDU before the updated data PDU with a RSN of 6 to be received in sequence and has not been delivered, to the upper layer in sequence, i.e., the SDU restored from the PDUs with the RSNs of 4 and 5.

In this embodiment, when the DISCARD_SN is not the SN of the PDU to be received in sequence, the L2-H ignores the discard notification PDU, i.e., not perform the operation of receiving the PDU to be received in sequence.

In the method of the embodiment two, when the discard timer expires, the transmitting end discards the SDU and the PDU including the SDU. Through transmitting the discard notification PDU including the SN of the discarded PDU, the receiving end learns information of the discarded PDU through the discard notification PDU, updates the receiving window, and delivers the SDU to the upper layer in sequence, so that the receiving end always waiting for the discarded PDU is avoided, the fact of packet loss (and the congestion occurs) on the radio link of the transmitting end is transmitted to the upper layer of the transmitting end (such as a TCP layer), causing the upper layer to reduce the transmission rate and achieving matching between the transmission rate of upper layer data and the transmission rate of radio link in the design of new L2 protocol of 5G as shown in FIGS. 3 and 4.

In addition, in the present disclosure, when the discard timer expires, the data link protocol sublayer discards the SDU and continues to process the PDU including the SDU. On one hand, the processing of the transmitting end is simplified, and on the other hand, the next SDU behind the SDU is further discarded, so that the fact of packet loss (and the congestion occurs) on the radio link of the transmitting end is transmitted to the upper layer of the transmitting end (such as the TCP layer), causing the upper layer to reduce the transmission rate and achieving matching between the transmission rate of upper layer data and the transmission rate of radio link in the design of new L2 protocol of 5G as shown in FIGS. 3 and 4

Embodiment Four

An embodiment of the present disclosure further provides a storage medium. In the embodiment, the storage medium may be configured to store program codes for executing the steps described below.

In step S1, a discard timer is started at a data link protocol sublayer of a transmitting end for a service data unit.

In step S2, when the discard timer expires, the SDU is discarded at the data link protocol sublayer, and one of following operations is performed on the SDU having constituted a data protocol data unit (PDU) at the data link protocol sublayer: replacing the SDU in the data PDU with a padding bit, discarding the data PDU and transmitting a discard notification PDU, and continuing to transmit the data PDU.

In this embodiment, the storage medium described above may include, but is not limited to, a USB flash drive, a read-only memory (ROM), a random access memory (RAM), a mobile hard disk, a magnetic disk, an optical disk or another medium capable of storing the program codes.

In this embodiment, a processor executes, according to the program codes stored in the storage medium, an operation of starting, the discard timer at the data link protocol sublayer of the transmitting end for the SDU;

In this embodiment, the processor executes, according to the program codes stored in the storage medium, an operation of when the discard timer expires, discarding the SDU at the data link protocol sublayer, and performing one of following operations on the SDU having constituted the data PDU at the data link protocol sublayer: replacing the SDU in the data PDU with the padding bit, discarding the data PDU and transmitting the discard notification PDU, and continuing to transmit the data PDU.

For specific examples in the embodiment, reference may be made to the examples described in the above-mentioned embodiments, and repetition will not be made herein.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only illustrative embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

What is claimed is:

1. A congestion processing method, performed by a transmitting end, comprising:
    starting a discard timer at a data link protocol sublayer of the transmitting end for a service data unit (SDU); and
    in response to determining that the discard timer expires, discarding the SDU at the data link protocol sublayer, and performing one of following operations on the SDU having constituted a data protocol data unit (PDU) at the data link protocol sublayer:
    replacing the SDU in the data PDU with a padding bit,
    discarding the data PDU and transmitting a discard notification PDU to the data link protocol sublayer of a receiving end, and
    continuing to transmit the data PDU.

2. The method of claim 1, wherein the data link protocol sublayer is a highest data link protocol sublayer L2-H, wherein the L2-H comprises at least one function of a group consisting of:
    header compression and decompression, security, retransmission, reordering and duplicate packet detection.

3. The method of claim 1, wherein starting the discard timer at the data link protocol sublayer for the SDU comprises:
    after the data link protocol sublayer receives a SDU coming from an upper layer, starting the discard timer for the SDU; or
    after the data link protocol sublayer performs a concatenation operation, starting the discard timer for a concatenated data SDU, wherein the data link protocol sublayer comprises a concatenation function for the SDU coming from the upper layer;
    wherein the upper layer comprises at least one of: a network layer L3, a transmission control protocol (TCP)/Internet protocol (IP) layer, an application layer, or a sublayer other than the data link protocol sublayer in a data link layer.

4. The method of claim 3, wherein in response to determining that the data link protocol sublayer comprises the concatenation function for the SDU coming from the upper layer, the SDU is a concatenated SDU; and
    in response to determining that the data link protocol sublayer does not comprise the concatenation function, the SDU is the SDU coming from the upper layer.

5. The method of claim 1, wherein replacing the SDU in the data PDU with the padding bit comprises:
    replacing a data field for the SDU in the data PDU with a preset padding bit.

6. The method of claim 1, wherein replacing the SDU in the data PDU with the padding bit comprises:
    in a case where the data PDU comprising the SDU has been delivered from the data link protocol sublayer to a lower protocol sublayer before the discard timer expires, in response to determining that the discard timer expires, replacing the SDU in the data PDU with the padding bit at the data link protocol sublayer, and indicating the lower protocol sublayer to discard the data PDU.

7. The method of claim 1, wherein the discard notification PDU comprises a sequence number of the data PDU and is used for indicating that the data PDU corresponding to the sequence number has been discarded by the transmitting end.

8. The method of claim 1, wherein discarding the data PDU and transmitting the discard notification PDU comprises:
  discarding the data PDU at the data link protocol sublayer, and notifying a lower protocol sublayer of the data link protocol sublayer of discarding the data PDU.

9. The method of claim 1, wherein after continuing to transmit the data PDU, the method further comprises:
  discarding a preset number of SDUs behind the SDU at the data link protocol sublayer.

10. A congestion processing method, performed by a receiving end, comprising:
  receiving a protocol data unit (PDU) at a data link protocol sublayer of the receiving end from the data link protocol sublayer of a transmitting end;
  in response to determining that the PDU is a data PDU comprising a service data unit (SDU), restoring the SDU from the data PDU, and in response to determining that all bits in the restored SDU are padding bits, ignoring the SDU in transmission of the SDU to an upper layer of the data link protocol sublayer of the receiving end; or
  in response to determining that the PDU is a discard notification PDU, obtaining a sequence number DISCARD_SN of a discarded data PDU from the discard notification PDU, and in response to determining that the DISCARD_SN is a sequence number of a data PDU to be received in sequence at the data link protocol sublayer of the receiving end, updating the data PDU to be received in sequence.

11. The method of claim 10, wherein restoring the SDU from the data PDU comprises:
  removing a PDU header of the data PDU to obtain the SDU; or
  removing the PDU header of the data PDU and performing at least one operation of integrity verification, decryption or decompression to obtain the SDU.

12. The method of claim 10, wherein ignoring the SDU in the transmission of the SDU to the upper layer of the data link protocol sublayer comprises:
  giving up delivering the SDU to the upper layer of the data link protocol sublayer in the transmission of the SDU to the upper layer of the data link protocol sublayer.

13. The method of claim 10, wherein updating the data PDU to be received in sequence comprises:
  updating a receiving window; and
  after the receiving window is updated, delivering a SDU, which is restored from a data PDU having a sequence number less than the sequence number of the updated data PDU to be received in sequence and has not been delivered, to the upper layer of the data link protocol sublayer in sequence.

14. The method of claim 13, wherein updating the receiving window comprises:
  updating a value of a receiving state variable to a sequence number of a data PDU to be received in sequence behind the data PDU corresponding to the DISCARD_SN, and updating a maximum value of the receiving state variable based on the updated value of the receiving state variable;
  wherein the receiving state variable is used for recording the sequence number of the data PDU to be received in sequence, and the maximum value of the receiving state variable is equal to the value of the receiving state variable plus a preset size of the receiving window.

15. The method of claim 13, wherein updating the data PDU to be received in sequence further comprises:
  after the receiving window is updated, in response to determining that the updated value of the receiving state variable is less than the value before the updating, updating a receiving hyper-frame number RX_HFN.

16. The method of claim 10, further comprising:
  in response to determining that the DISCARD_SN is not the sequence number of the data PDU to be received in sequence at the data link protocol sublayer, ignoring the discard notification PDU.

17. A congestion processing apparatus, applied to a receiving end, and comprising:
  a processor; and
  a memory for storing instructions executable by the processor,
  wherein the processor is configured to implement the method of claim 10.

18. The apparatus of claim 17, wherein the processor updates the data PDU waiting to be received in sequence in the following manner:
  updating a receiving window, and
  after the receiving window is updated, delivering a SDU, which is restored from a data PDU having a sequence number less than the sequence number of the updated data PDU to be received in sequence and has not been delivered, to the upper layer of the data link protocol sublayer in sequence,
  wherein a received state variable is configured to record the sequence number of the data PDU to be received in sequence; and the maximum value of the receiving state variable is equal to the value of the receiving state variable plus a preset size of the receiving window,
  or, wherein the processor is further configured to, in response to determining that the DISCARD_SN is not the sequence number of the data PDU to be received in sequence at the data link protocol sublayer, ignore the discard notification PDU.

19. A congestion processing apparatus, applied to a transmitting end, and comprising:
  a processor; and
  a memory for storing instructions executable by the processor,
  wherein the processor is configured to:
    start a discard timer at a data link protocol sublayer of the transmitting end for a service data unit (SDU); and
    in response to determining that the discard timer expires, discard the SDU at the data link protocol sublayer, and perform one of following operations on the SDU having constituted a data protocol data unit (PDU) at the data link protocol sublayer:
    replacing the SDU in the data PDU with a padding bit,
    discarding the data PDU and transmitting a discard notification PDU to the data link protocol sublayer of a receiving end, and
    continuing to transmit the data PDU.

20. The apparatus of claim 19, wherein the data link protocol sublayer is a protocol sublayer L2-H, wherein the L2-H comprises at least one function of a group consisting of:
  header compression and decompression, security, retransmission, reordering and duplicate packet detection.

* * * * *